United States Patent [19]
Insolio et al.

[11] 4,083,274
[45] Apr. 11, 1978

[54] GLASS CUTTER

[75] Inventors: Thomas A. Insolio, Bristol; Vincent T. Kozyrski, New Britain, both of Conn.

[73] Assignee: The Fletcher-Terry Company, Farmington, Conn.

[21] Appl. No.: 802,129

[22] Filed: May 31, 1977

[51] Int. Cl.² .......................... B26D 3/08; C03B 33/10
[52] U.S. Cl. ........................................ 83/12; 83/481; 83/698; 30/164.95
[58] Field of Search ............... 83/12, 11, 10, 481, 83/676, 698; 30/164.95

[56] References Cited
U.S. PATENT DOCUMENTS

| 3,461,755 | 8/1969 | Gerew | 83/12 |
| 3,682,027 | 8/1972 | Insolio et al. | 83/12 |

Primary Examiner—J. M. Meister
Attorney, Agent, or Firm—McCormick, Paulding & Huber

[57] ABSTRACT

Two versions are disclosed, and each includes a pillar post mounted for castering action in a head which moves relative to the glass sheet. In both versions the pillar post has a bifurcated lower portion, with a rectangular insert provided between the furcations and a glass cutting wheel mounted in the insert. In one version the insert has an upstanding stem releasably retained in a central bore defined in the pillar post, and in the second version the insert has a laterally projecting pin which is releasably retained in a side slot provided in one of the pillar post furcations. In both versions the insert projects beyond the bifurcated pillar post to facilitate removal thereof, and both versions are designed to permit assembly of the insert in its associated pillar post in only one orientation.

10 Claims, 9 Drawing Figures

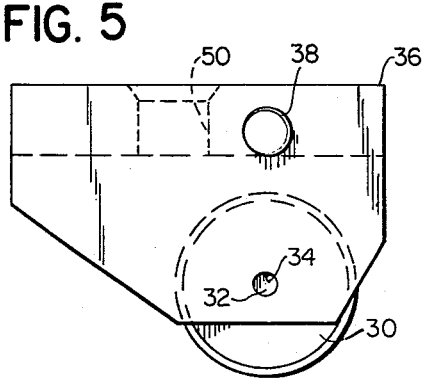
FIG. 5
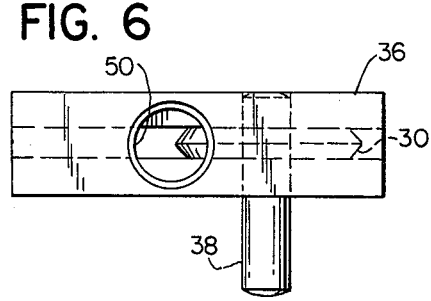
FIG. 6
FIG. 7
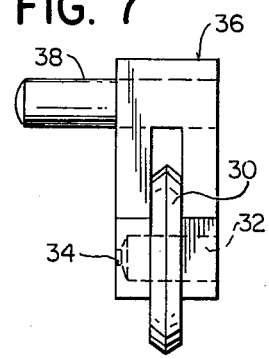
FIG. 8
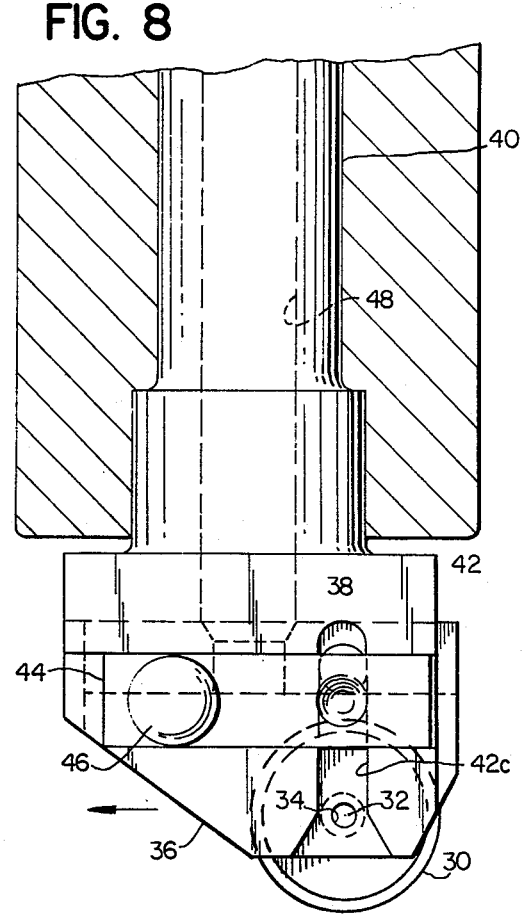
FIG. 9
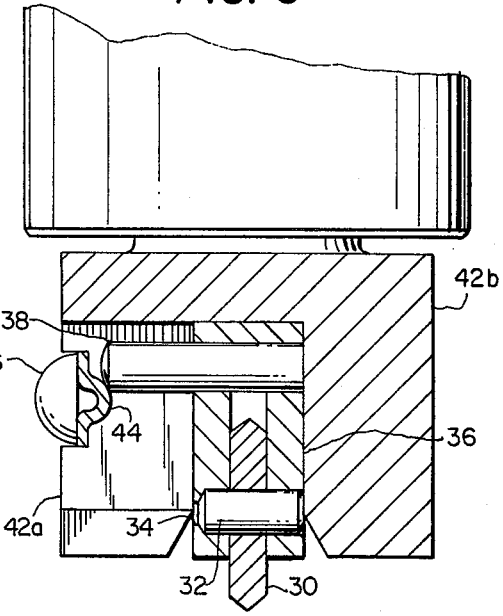

GLASS CUTTER

BACKGROUND OF THE INVENTION

Prior art glass cutters, of the type for use in a head which traverses a glass sheet to be scored, generally include a pillar post journalled in the head, and the pillar post has a lower portion which is either adapted to receive a spring clip retainer, such as shown for example in U.S. Pat. No. 3,373,488 issued to A. T. Fletcher, or such prior art designs include a plug type insert such as that shown in U.S. Pat. No. 3,461,755 to Gerew et al.

Other types of removable scoring wheel mounting devices have been proposed in the art, but most of these have spring clip retainers, and therefore do not support the scoring wheel securely enough for present day glass cutting machines. The few insert designs which do not utilize a U-shaped retaining clip suffer from disadvantages in the manner in which these inserts are retained in the pillar post, and also in respect to the degree of difficulty in removing these inserts for replacement or repair.

The chief aim of the present invention is to provide a generally rectangular insert in a complementary shaped slot in the pillar post, and to provide improved means for retaining the insert, so that the removal for replacement or repair is not adversely affected.

SUMMARY OF THE INVENTION

This invention relates generally to devices for use in a pillar post of the type normally provided in the head of a glass cutting apparatus, and deals more particularly with a unique pillar post and insert assembly so designed that the scoring wheel is securely held in the insert and the insert in turn securely held in the pillar post itself, these advantages being achieved without sacrifice to the ease of removal for replacement and repair of the insert.

The pillar post is journalled in the cutting head of the machine, and has a lower bifurcated portion of larger cross sectional size than the post itself, and the insert is provided in a rectangular slot defined by the pillar post furcations, with the glass cutting wheel being provided in the insert on a conventional axle. Means is provided for releasably retaining the insert in this slot, and the insert has a projecting part extending beyond the lower portion of the pillar post to facilitate removal of the insert for replacement or repair.

In one version the insert has an upwardly projecting stem which defines a plurality of tines for yieldably engaging the sides of an axial bore in the pillar post to retain the insert in the pillar post.

In a second version the insert is releasably retained in the pillar post slot by means of a laterally projecting pin which is received in a recess provided for this purpose in one of the pillar post furcations, and which projecting pin also engages resilient means provided in the pillar post.

BRIEF DESCRIPTION OF THE DRAWINGS

FIG. 5 is a side elevational view of an alternative insert construction constructed in accordance with a second version of the present invention, FIG. 6 is a plan view of the insert illustrated in FIG. 5, FIG. 7 is a front elevational view of the insert illustrated in FIGS. 5 and 6, FIG. 8 is a side elevational view of the FIG. 5 insert mounted in an associated pillar post and also illustrating in section a portion of the head in which such pillar post is journalled.

FIG. 9 is a vertical elevational view partly in section illustrating the insert and pillar post assembly of FIG. 8.

DETAILED DESCRIPTION OF THE FIRST PREFERRED EMBODIMENT ILLUSTRATED IN FIGS. 1-4 INCLUSIVELY

Figure 1:
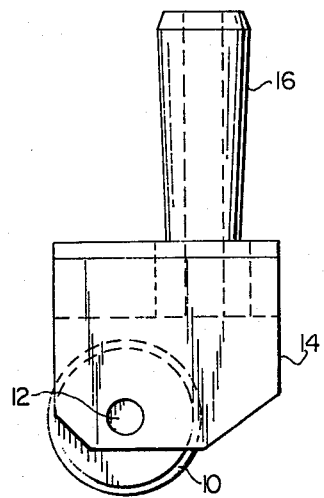
FIG. 1 shows in side elevation a preferred insert of the type used in the first preferred embodiment of the present invention.
Figure 2:
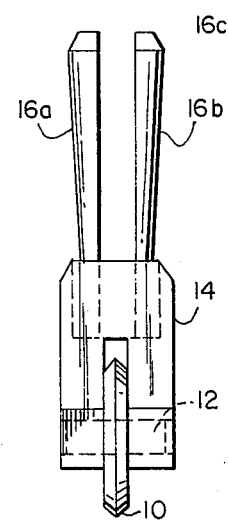
FIG. 2 shows in a front elevational view the insert of FIG. 1.

Turning now to the drawings in greater detail, FIGS. 1 and 2 show a glass scoring wheel 10 mounted on an axle 12, which axle has end portions projecting beyond the plane of the cutting wheel 10 and received in aligned openings provided for this purpose in a generally rectangular lower portion 14 of a block type insert. The insert has an upwardly extending stem portion 16 which is defined by two spaced tines, 16a and 16b, with an outside diameter at the upper ends of this stem 16 and as indicated generally at 16c in FIG. 2, comprising a dimension somewhat greater than the internal bore 18 of the pillar post 20 illustrated in FIGS. 3 and 4. Thus, when the insert of FIGS. 1 and 2 is assembled with the pillar post 20 of FIGS. 3 and 4 these tines, 16a and 16b, will be moved toward one another slightly so as to retain the insert in the pillar post, and more particularly so as to retain the rectangular lower portion 14 of the insert in a complementary shaped slot provided for this purpose in a lower bifurcated portion 22 of the pillar post.

Figure 4:
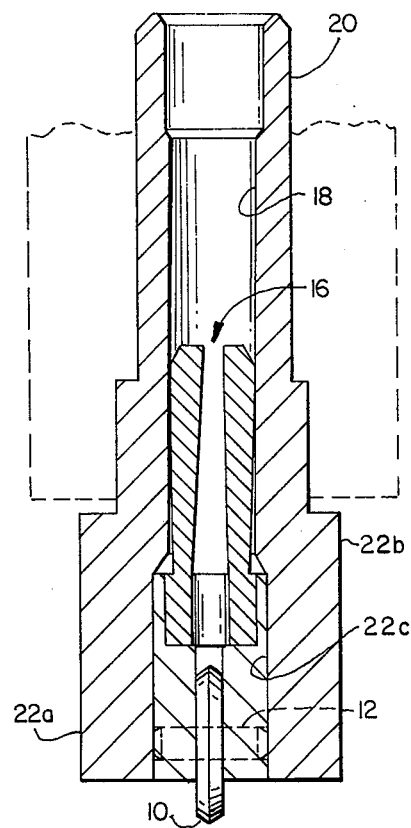
FIG. 4 is also a vertical sectional view of the pillar post and insert assembly of FIG. 3, but is taken along an axial plane at right angles to that of FIG. 3.

As best shown in FIG. 4 the lower portion 22 of the pillar post has left and right hand furcations 22a and 22b which define a rectangular slot 22c therebetween. This lower portion 22 is also of rectangular configuration and has a projecting portion 14a to be described. It is an important feature of the present invention that the upwardly projecting stem 16 of the insert as a vertical dimension, or length, such that the upper end of said stem engages the bore 18 in the pillar post before the rectangular portion 14 of the insert is received in its associated slot 22c. This facilitates assembly of the insert with the pillar post.

Figure 3:
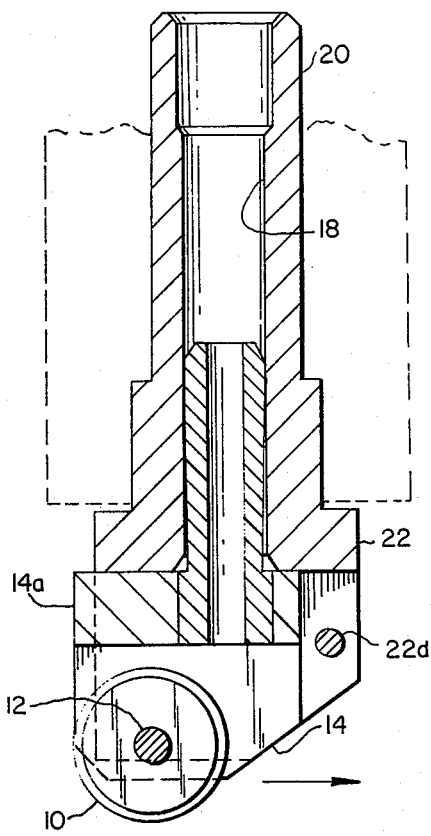
FIG. 3 is a vertical sectional view of the insert of FIG. 1 mounted in assembled relationship with the pillar post associated therewith, and illustrating a portion of the head in which the pillar post is journalled, the latter being indicated by broken lines.

FIG. 3 illustrates the insert, particularly the lower portion 14 thereof, and also the direction of motion for the cutting wheel with respect to the glass sheet (not shown). The rearwardly projecting part 14a of the lower insert portion 14 extends rearwardly beyond the boundaries of the lower pillar post portion 22 in order to facilitate removal of the insert from the pillar post, as for replacement and/or repair of the cutting wheel 10. The axis of rotation of the axle 12, upon which the cutting wheel 10 is provided, is preferably located rearwardly of the center line or axis of the bore 18 in the pillar post in order to contribute to the castering action of the device and it will be apparent that the projecting part 14a of the insert is also located on the same side of the said center line of the pillar post as is the cutting wheel 10. A pin 22d is provided in the lower portion 22 of the insert in order to preclude assembly of the insert with its associated pillar post in any orientation other than shown for it in FIG. 3.

The insert and pillar post have aligned central openings through which lubricating oil or cutting fluids can be provided to the cutting wheel, and it is noted that the stem portion 16 of the insert is not only adapted to be force fit within the bore 18 of the pillar post but that this feature does not detract from the fluid passage feature. The tines 16a and 16b are preferably chamfered in order to facilitate the assembly of the insert with the pillar post. It is further noted that the lower end of the bore 18 in the pillar post may also be chamfered slightly as indicated in FIGS. 3 and 4 so as to further facilitate the assembly of the insert with its associated pillar post. Once assembled, however, the insert and more particularly the lower portion thereof 14 is securely held in the rectangular slot defined between the furcations 22a and 22b of the pillar post. The cutting wheel 10 is securely held on a relatively long axle 12 and as a result of this construction a very rugged glass cutter is provided, which glass cutter nevertheless permits the insert portion thereof to be quickly and easily moved for replacement or repair should it become worn. The central bore or opening in the pillar post and insert are offset with respect to the wheel axle 12 so that fluid is deposited on the leading edge of wheel 10.

DETAILED DESCRIPTION OF THE SECOND PREFERRED EMBODIMENT ILLUSTRATED IN FIGS. 5-9 INCLUSIVELY

FIG. 5 shows an alternative insert construction adapted for assembly with a pillar post of slightly different configuration, the latter being shown in FIGS. 8 and 9. The FIG. 5 insert is also of generally rectangular configuration, and has a projecting end (preferably on the same side of the center line of the pillar post axis as the axle for the cutting wheel) projecting rearwardly beyond the lower portion of the pillar post in order to facilitate removal of the insert in much the same manner as discussed previously with reference to the first embodiment. The FIG. 5 insert is generally rectangular as mentioned above, and has a slotted lower portion which is adapted to receive a cutting wheel 30 mounted on an axle 32 provided for this purpose in aligned openings in the lower portion of the rectangular insert. The axle 32 is receivable in the aligned openings defined in the lower portion of the insert, but is adapted to be assembled therewith from only one side, as best shown in FIGS. 7 and 9. The left hand portion of the insert 36 has its opening so configured that it does not extend through the side wall thereof, but a relatively small opening is provided to facilitate removal of the axle for replacement or repair of the cutting wheel in its associated insert. The small opening in the left hand side wall of the insert is illustrated generally at 34 in FIG. 7.

The insert 36 also includes a projecting part or pin 38 which serves to releasably retain the insert in a rectangular downwardly open slot provided for this purpose in the lower portion of the pillar post 40 of FIG. 8. The lower portion of the pillar post, indicated generally at 42, includes left and right hand furcations 42a and 42b which cooperate to define the downwardly open slot for receiving the insert, and one of these furcations, as shown the left hand furcation 42a, includes a side slot 42c for receiving the projecting pin 38 on the insert upon assembly of the insert with the pillar post as shown in FIGS. 8 and 9. A spring 44 is riveted to the left hand furcation of the insert 42a by means of rivit 46, and the spring 44 includes a portion which extends across the slot 42c in order to provide an abutment which will yieldably permit the passage of the end of the pin 38 on the insert and thereby releasably retain the insert 36 in the rectangular slot defined for it in the lower portion 42 of the pillar post.

As in the previously described embodiment a bore is preferably provided in the pillar post, as indicated generally at 48, so that a cutting oil or fluid can be fed downwardly through this bore 48, and through an aligned opening 50 provided for this purpose in the insert, in order to deliver cutting oil or fluid to the wheel 30. The axle 32 for the wheel is offset from the axis of the bore 48 and opening 50 so that this fluid will be provided to the leading edge of the wheel as best shown in FIGS. 6 and 8.

We claim:

1. A glass cutter, for use in a glass cutting machine having a head adapted to traverse a glass sheet in at least a longitudinal direction, and comprising:
    (a) pillar post means having a post adapted for insertion in a mounting which rotatably supports said post on a vertical axis in the cutting machine head,
    (b) said pillar post means having a lower bifurcated portion of larger cross sectional size than said post, and defining a downwardly open rectangular slot,
    (c) insert means receivable upwardly in said pillar post slot and having parallel sides engaging the inner sides of the furcations of said pillar post,
    (d) a glass cutting wheel and axle therefor, said axle mounted in said insert,
    (e) means for releasably retaining said insert in said slot, and
    (f) said insert having said sides projecting longitudinally beyond the lower portion of said pillar post to facilitate removal of the insert from the pillar post.

2. A glass cutter as defined in claim 1 wherein said means for releasably retaining said insert in said slot comprises an upwardly projecting stem on said insert and said stem having at least two tines for yieldably engaging the sides of an axial bore in said pillar post.

3. A glass cutter as defined in claim 2 wherein said stem has a vertical dimension slightly greater than the vertical dimension of said rectangular slot in said pillar post to facilitate the assembly of said insert with said pillar post.

4. A glass cutter as defined in claim 1 wherein said cutting wheel axle is spaced horizontally from the vertical axis of said pillar post to achieve a castering action for said cutter, and wherein said projecting insert sides are on the same side of said vertical axis as said wheel axle, said rectangular slot extending longitudinally through said bifurcated lower portion of said pillar post, and means for blocking one end of said through slot to permit insertion of said insert in said slot in only one possible orientation.

5. A glass cutter as defined in claim 1 wherein said means for releasably retaining said insert in said slot comprises a laterally projecting part associated with at least one side of said insert, and resilient means provided in one of said pillar post furcations and cooperating with said projecting part to retain the insert in said slot.

6. A glass cutter as defined in claim 5 wherein said projecting part comprises a pin projecting laterally from said insert side and slidably received in a pin opening provided for it in said pillar post furcation.

7. A glass cutter as defined in claim 6 wherein said resilient means comprises a spring held in said pillar post furcation and having a spring portion in said pillar post pin opening for yieldably engaging said pin to retain said insert in said slot.

8. A glass cutter as defined in claim 7 wherein said cutting wheel is spaced horizontally from the vertical axis of said pillar post to achieve a castering action for said cutter, and wherein the projecting insert sides are on the same side of said vertical axis as said wheel axle, said rectangular slot extending through said bifurcated lower portion of said pillar post, and said pin opening oriented in longitudinally spaced relation to said pillar post axis to permit insertion of said insert in said slot in only one possible orientation.

9. A glass cutter as defined in claim 1 wherein said wheel is provided in a slot defined by said insert, and wherein said axle is received in aligned openings so as to extend across said cutting wheel slot, said pillar post furcation covering the ends of said axle openings.

10. A glass cutter as defined in claim 9 wherein only one of said aligned axle openings extends outwardly through said insert side so as to receive said axle.

* * * * *